G. J. HUTCHINGS.
STEAM COOKER.
APPLICATION FILED NOV. 3, 1910.
998,096.
Patented July 18, 1911.
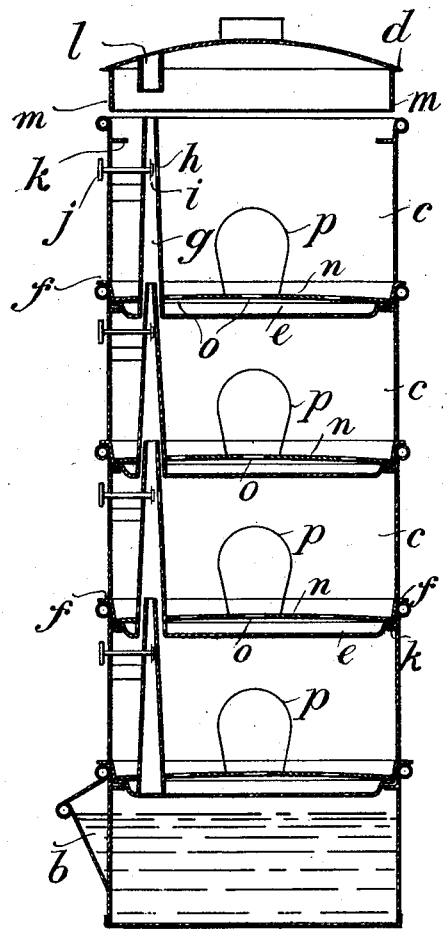
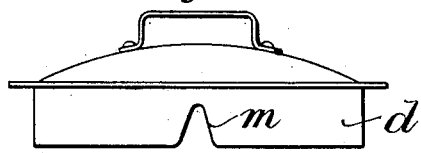
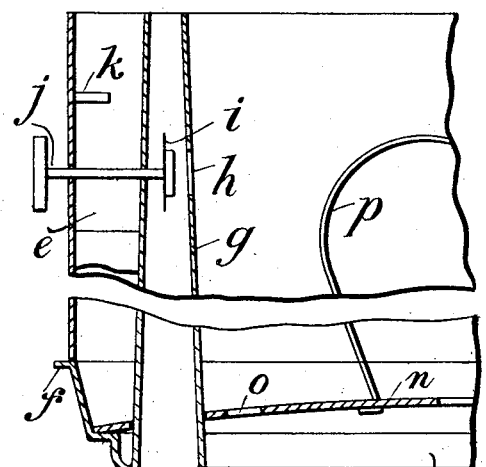

UNITED STATES PATENT OFFICE.

GEORGE JOHN HUTCHINGS, OF LONDON, ENGLAND.

STEAM-COOKER.

998,096.  Specification of Letters Patent.  Patented July 18, 1911.

Application filed November 3, 1910. Serial No. 590,527.

*To all whom it may concern:*

Be it known that I, GEORGE JOHN HUTCHINGS, of 116 Blackfriars road, London, S. E., England, steam-cooker manufacturer, have invented new and useful Improvements Relating to Steam-Cookers; and I do hereby declare that the following is a full, clear, and exact description of the same, reference being had to the accompanying drawings, forming a part hereof.

My invention has reference to apparatus for cooking or steaming foods or the like and has for its object to provide an improved device whereby a number of articles of food may be cooked at the same time in separate compartments without one article being contaminated by the flavor or odor of the other or others.

The invention has particular reference to a device of this kind in which a number of containers are arranged one above the other upon a saucepan, boiler or the like and having means whereby the steam from said saucepan may be admitted to each or all of the food containers or compartments at will.

In order that my invention may be readily understood and carried into effect I will now proceed to describe the same fully with reference to the accompanying drawings in which:—

Figure 1 is a vertical section of a steam cooker comprising four separate food cooking compartments constructed in accordance with my invention. Fig. 2 is a view of a portion of the top of one of the food containers drawn to a larger scale. Fig. 3 is a side view of cover showing slot hereinafter referred to.

Referring to Fig. 1 my improved device comprises a boiler or saucepan $a$ which may if desired be provided with a filling aperture or spout $b$. Adapted to fit one within the other as shown in the drawings are a number of separate food containers $c$ the top one of which is adapted to be closed by a lid or cover $d$. As each of the said containers is similar in construction I will describe one of them only. It comprises a preferably cylindrical vessel the bottom of which is formed with a well $e$ for a purpose to be hereinafter explained, a flange $f$ being provided for the purpose of forming a tight joint when the containers are placed one upon the other. Located at one side of the vessel $c$ is a preferably rectangular tube $g$ passing right through the container so as to admit of steam from the boiler $a$ flowing through the assembled containers $c$ as will be readily understood on reference to Fig. 1. Each tube is provided with an aperture $h$ adapted to be closed by a valve $i$ operated by the rod $j$ which projects through the exterior of the vessel $c$. At a short distance from the top of each of the vessels $c$ I provide a pin or stud $k$. I may use one at front and another at back to insure the cover being at once correctly positioned. The cover $d$ is provided with a downwardly projecting cap $l$ which is adapted to seal or close the top of the tube $g$ when arranged in position. Formed in the depending flange of said cover $d$ is a slot or slots $m$ into which the pin $k$ is adapted to engage. By means of this arrangement it will be seen that it will be possible only to place the cover in position upon the uppermost of the vessels $c$ in such a manner that the cap $l$ will close the top of the tube $g$. Each of the containers $c$ is provided with a false bottom $n$ of convex shape as shown and having holes or apertures $o$ formed therein and also provided with handles $p$ serving for the removal of said false bottom when required.

The operation of my device is as follows: The steam generated in the saucepan or boiler $a$ passes up through the tubes $g$ and apertures $h$ into each of the compartments $c$ the valves $i$ being opened as shown in the lowermost one of the said compartments in Fig. 1 the upper end of the tube $g$ being closed by the cap $l$ carried by the cover $d$. The articles of food or the like which it is desired to steam or cook are placed in the vessel $c$ resting upon the false bottom $n$ and any steam which may condense in the said vessels flows through the apertures $o$ and collects in the well $e$ thus preventing the food becoming sodden by the water. When the food or the like in any one of the compartments is sufficiently steamed or cooked the admission of steam may be cut off therefrom by operating the valve $i$ by means of its rod or spindle $j$ thus closing the inlets $h$ but at the same time permitting its contents being kept hot by the steam in the pipe $g$ and in the compartments situated immediately above and below it.

By means of my improved device many important advantages are attained over apparatus of a similar kind as heretofore constructed for instance the provision of a rectangular tube $g$ gives more space in the cooker and also admits of the valve $i$ having a better seating over the orifice $h$; the provision of the pin or pins $k$ is also an important feature for the reason that the cover will be guided into such position that the cap $l$ will at once close the top of the pipe $g$ when placed in position while the provision of the flange bottom $n$ in combination with the well $e$ allows the condensed steam being kept out of contact with the materials being steamed or cooked.

The apparatus may be made of any suitable material and although I find that a circular form is very convenient I do not desire to limit myself to any particular shape of the boiler or cooking vessels or to the number of superposed vessels $c$. I may if desired provide partitions within the said vessels $c$ so as to admit of more than one kind of food being cooked therein.

What I do claim as my invention and desire to receive by Letters Patent is:—

A steam cooker comprising in combination, a plurality of superposed compartments, tubular elements for conveying steam from one compartment to the other, a lid for the uppermost compartment provided with a closure for the tubular elements thereof, said upper compartment and lid having pin and slot mechanisms for insuring registry of the closure of the top with said tubular elements when the top or lid is placed in position.

In testimony whereof I affix my signature in presence of two witnesses.

GEORGE JOHN HUTCHINGS.

Witnesses:
 SAM LAMBERT,
 WILLIAM HILL.

Copies of this patent may be obtained for five cents each, by addressing the "Commissioner of Patents, Washington, D. C."